US007328051B1

(12) United States Patent
Tanzi

(10) Patent No.: US 7,328,051 B1
(45) Date of Patent: Feb. 5, 2008

(54) GLOBAL VIDEO AUDIO SYSTEM

(76) Inventor: John Tanzi, 229 Arlene St., Staten Island, NY (US) 10314

( * ) Notice: Subject to any disclaimer, the term of this patent is extended or adjusted under 35 U.S.C. 154(b) by 407 days.

(21) Appl. No.: 11/141,467

(22) Filed: May 31, 2005

Related U.S. Application Data

(60) Provisional application No. 60/624,471, filed on Nov. 1, 2004.

(51) Int. Cl.
*H04M 1/00* (2006.01)

(52) U.S. Cl. ............................... 455/575.9; 455/575.1; 455/556.1; 340/937; 340/539.25; 348/207.99

(58) Field of Classification Search ............. 455/575.9, 455/575.1, 556.1; 340/937, 539.25; 348/207.99
See application file for complete search history.

(56) References Cited

U.S. PATENT DOCUMENTS

| | | | | |
|---|---|---|---|---|
| 5,680,123 | A * | 10/1997 | Lee | 340/937 |
| 5,978,017 | A | 11/1999 | Tino | |
| 6,449,540 | B1 | 9/2002 | Rayner | |
| 6,542,076 | B1 * | 4/2003 | Joao | 340/539.14 |
| 7,245,204 | B2 * | 7/2007 | Ramos et al. | 340/426.12 |
| 2003/0080878 | A1 * | 5/2003 | Kirmuss | 340/936 |
| 2003/0081128 | A1 * | 5/2003 | Kirmuss | 348/207.99 |
| 2004/0056954 | A1 * | 3/2004 | Crandall et al. | 348/148 |
| 2004/0145496 | A1 * | 7/2004 | Ellis | 340/905 |
| 2005/0040939 | A1 * | 2/2005 | Jobes et al. | 340/438 |

* cited by examiner

*Primary Examiner*—Danh Le

(57) ABSTRACT

An audio and video monitoring system that is incorporated into a vehicle to monitor ongoing activities on a continual basis. The monitoring system is analogous to the two "black boxes" that are incorporated into all aircraft, in which one of the black boxes records all electronic actions and the other black box records all audio signals within the cockpit. The monitoring system combines these features and also has a video component. The monitoring system activates only when either a vehicle alarm is triggered or when the vehicle is running.

3 Claims, 2 Drawing Sheets

Remote System activates GPS.

GLOBAL VIDEO AUDIO SYSTEM

CROSS-REFERENCE TO RELATED APPLICATIONS

This application claims the benefit of U.S. Provisional Application No. 60/624,471, filed Nov. 1, 2004.

BACKGROUND OF THE INVENTION

The present invention concerns that of an audio and video monitoring system that is incorporated into a vehicle to monitor ongoing activities on a continual basis.

DESCRIPTION OF THE PRIOR ART

U.S. Pat. No. 6,449,540, issued to Rayner, discloses an event recorder incorporated with a vehicle, comprised of a video for a 360 degree view, sound and location sensors for capturing and playing back data of the surrounding environment and show harassment by law enforcement officials.

U.S. Pat. No. 5,978,017, issued to Tino, discloses a multi-camera video system with cameras aimed at the front, rear, and driver for recording accidents and traffic stops.

U.S. Pat. No. 5,680,123, issued to Lee, discloses a vehicle monitoring system using a plurality of video cameras that are activated by the triggering of an alarm.

SUMMARY OF THE INVENTION

The present invention concerns that of an audio and video monitoring system that is incorporated into a vehicle to monitor ongoing activities on a continual basis. The monitoring system is analogous to the two "black boxes" that are incorporated into all aircraft, in which one of the black boxes records all electronic actions and the other black box records all audio signals within the cockpit. The monitoring system combines these features and also has a video component. The monitoring system activates only when either a vehicle alarm is triggered or when the vehicle is running.

There has thus been outlined, rather broadly, the more important features of an audio and video monitoring system for vehicles that the detailed description thereof that follows may be better understood and in order that the present contribution to the art may be better appreciated. There are, of course, additional features of the audio and video monitoring system for vehicles that will be described hereinafter and which will form the subject matter of the claims appended hereto.

In this respect, before explaining at least one embodiment of the audio and video monitoring system for vehicles in detail, it is to be understood that the audio and video monitoring system for vehicles is not limited in its application to the details of construction and to the arrangements of the components set forth in the following description or illustrated in the drawings. The audio and video monitoring system for vehicles is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present audio and video monitoring system for vehicles. It is important, therefore, that the claims be regarded as including such equivalent constructions insofar as they do not depart from the spirit and scope of the present invention.

It is therefore an object of the present invention to provide an audio and video monitoring system for vehicles which has all of the advantages of the prior art and none of the disadvantages.

It is another object of the present invention to provide an audio and video monitoring system for vehicles which may be easily and efficiently manufactured and marketed.

It is another object of the present invention to provide an audio and video monitoring system for vehicles which is of durable and reliable construction.

It is yet another object of the present invention to provide an audio and video monitoring system for vehicles which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
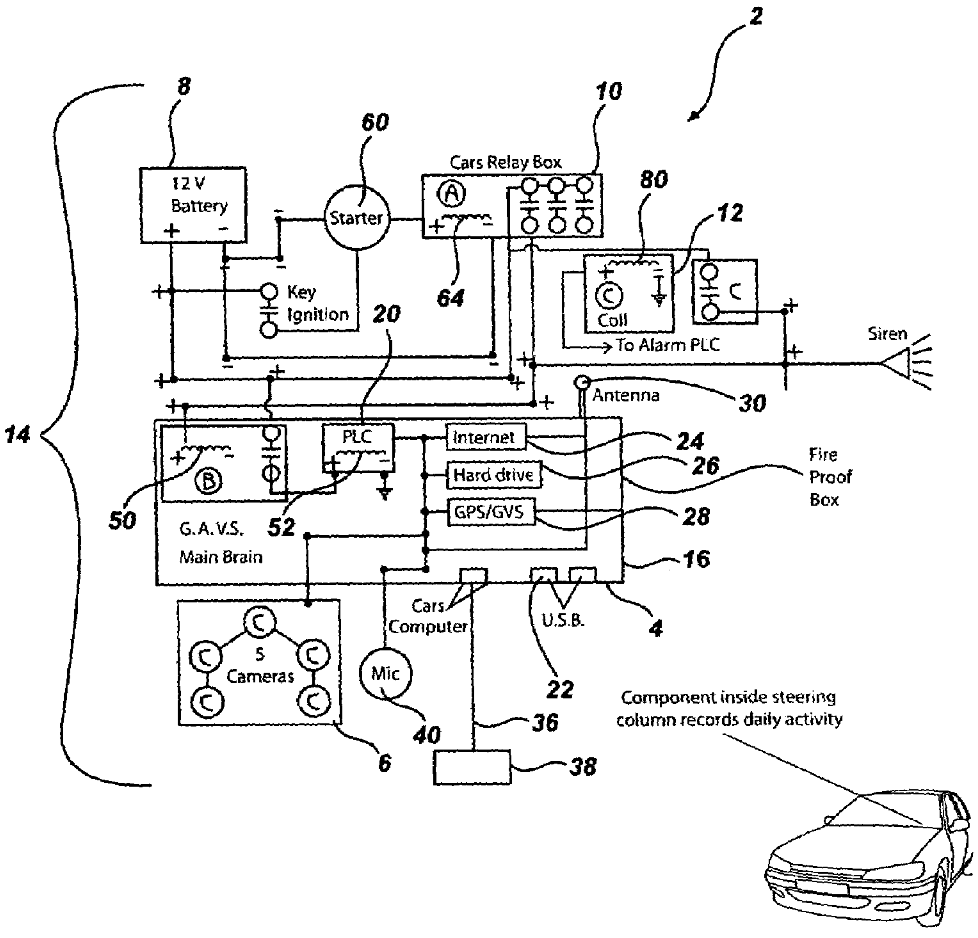
FIG. 1 shows a schematic view of the monitoring system.

FIG. 1 shows a schematic view of the monitoring system 2. Monitoring system 2 includes several components, including a main unit 4, a plurality of cameras 6, a power source 8, a relay box 10, and an alarm system 12, all of which are located within or associated with a vehicle 14. The power source 8 is preferably the vehicle battery, with the vehicle battery being either a twelve volt or forty-eight volt battery.

Main unit 4 comprises several active components and is located in the steering column of the vehicle 14. Main unit 4 has an outer casing 16 that is fireproof and has an internal PLC chip 20, which serves as the "brain" of the main unit 4. Furthermore, main unit 4 also has a plurality of external USB ports 22, which allow for the retrieval of data from the main unit 4 when needed.

Main unit 4 also has an internal modem 24, an internal hard drive 26, and GPS/GVS hardware 28 to allow it a vast array of electronic capabilities. All of these units are interconnected to one another and to the PLC chip 20. The hard drive 26 itself has enough memory to store up to 40 hours of activity. Main unit 4 further has a GPS antenna 30 to help the GPS/GVS hardware 28 to properly communicate with the various GPS satellites.

Main unit 4 has an electrical connection 36 to a vehicle computer 38. Also, main unit 4 has at least one microphone 40 which is used to record audio sounds that occur either within the vehicle when it is in operation and also when the vehicle alarm is set off. The electrical connection 36 that connects to the vehicle computer 38 allows the hard drive 26 to essentially record all electronic "happenings" within the vehicle, such as speed information, ongoing braking information, gas mileage, and other information that might not normally be available unless it was personally observed. By having this connection in place, various employees and other individuals can essentially be remotely or secretly monitored on an ongoing basis.

As shown in FIG. 1, a B coil 50 and a PLC coil 52 are present in the main unit 4. The B coil 50 is normally in an open position when the main unit 4 is not on, preventing power from getting to the main unit 4. However, in various circumstances, the B coil 50 and the PLC coil 52 will be placed into a closed position, thereby allowing power to reach the main unit.

The starter 60 within the vehicle is connected to the relay box 10, which has an A coil 64. When the starter 60 is activated by the ignition being activated, the A coil 64 will close, causing the B coil 50 and the PLC coil 52 to close also. When the vehicle is shut down, the A coil 64 opens, causing the B coil 50 and the PLC coil 52 also to open, thereby shutting down the main unit 4.

A C coil 80 is associated with the alarm system 12, which is electronically attached to the main unit 4 also. If the alarm system is triggered, then the C coil 80 closes, forcing the B coil 50 and the PLC coil 52 to close, thereby activating the main unit 4.

Figure 2:
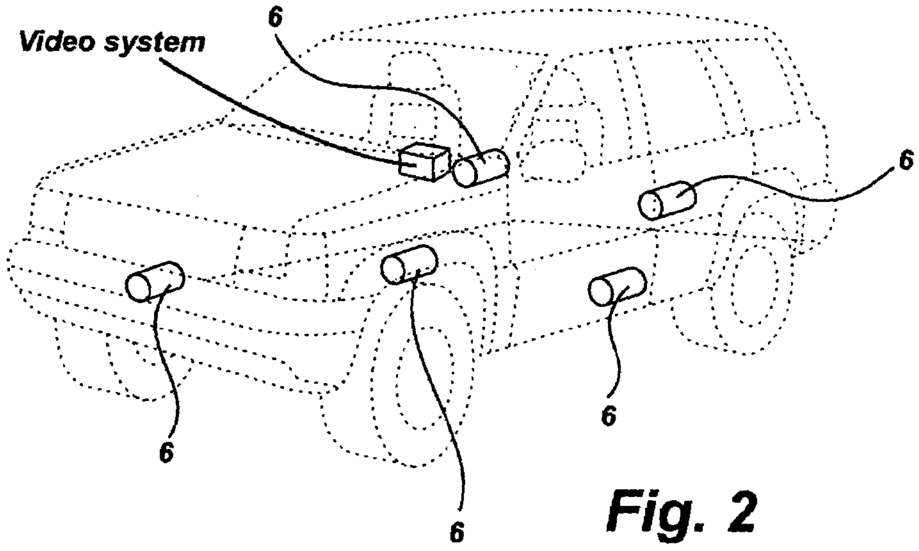
FIG. 2 shows a side view of possible locations of the placement of the cameras on the vehicle.

FIG. 2 shows a side view of possible locations of the placement of the cameras 6 on the vehicle. Preferably, there are five cameras 6 that are part of the present invention, but there could be more or less, depending on various considerations.

Figure 3:
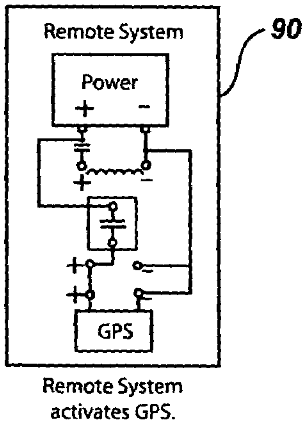
FIG. 3 shows an electronic schematic of a remote system associated with the monitoring system.

FIG. 3 shows an electronic schematic of a remote system 90 associated with the monitoring system 2. The remote system 90 acts as a remote control that activates the GPS/GVS hardware 28 within the main unit 4 and allows for the vehicle's location to then be determined.

What I claim as my invention is:

1. A monitoring system in combination with a vehicle, the monitoring system comprising:

(a) a main unit located within the vehicle, the main unit having an outer casing, (b) a plurality of cameras attached to the main unit, (c) a relay box attached to the main unit, (d) an alarm system attached to the main unit, (e) a power source for providing power to the main unit, (f) an internal PLC chip located within the main unit, the internal PLC chip designed to serve as the memory of the main unit, (g) a plurality of external ports attached to the main unit, (h) an internal hard drive attached to the main unit, (i) an internal modem attached to the main unit, (j) global positioning system (GPS) software located within the main unit to assist the monitoring system, (k) a GPS antenna to attached to the main unit, (l) a computer located within the vehicle, the computer being electronically connected to the main unit, (m) means for performing audio recordings, and (n) means for activating the main unit when the vehicle is started.

2. A monitoring system in combination with a vehicle according to claim 1 wherein the power source for providing power to the main unit preferably comprises a vehicle battery.

3. A monitoring system in combination with a vehicle according to claim 2 wherein the means for performing audio recordings further comprises at least one microphone, the microphone being used to record audio sounds.

* * * * *